Oct. 1, 1968
O. MITCHELL ET AL
3,403,524
MACHINE FOR DISPENSING SEMI-FROZEN DRINKS AND CONTROL THEREFOR
Filed Feb. 13, 1967
2 Sheets-Sheet 1
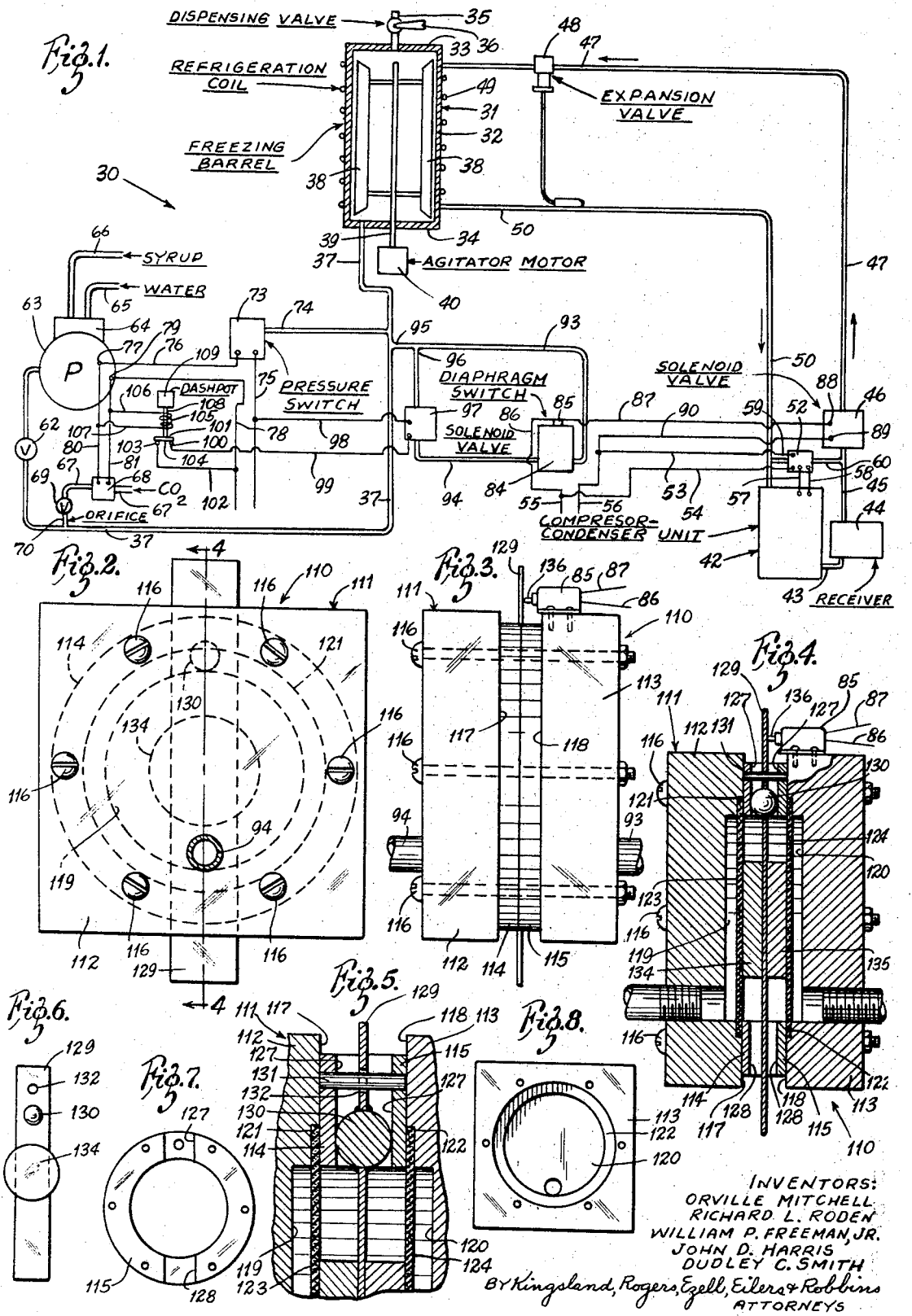
INVENTORS:
ORVILLE MITCHELL
RICHARD L. RODEN
WILLIAM P. FREEMAN, JR.
JOHN D. HARRIS
DUDLEY C. SMITH
BY Kingsland, Rogers, Ezell, Eilers & Robbins
ATTORNEYS

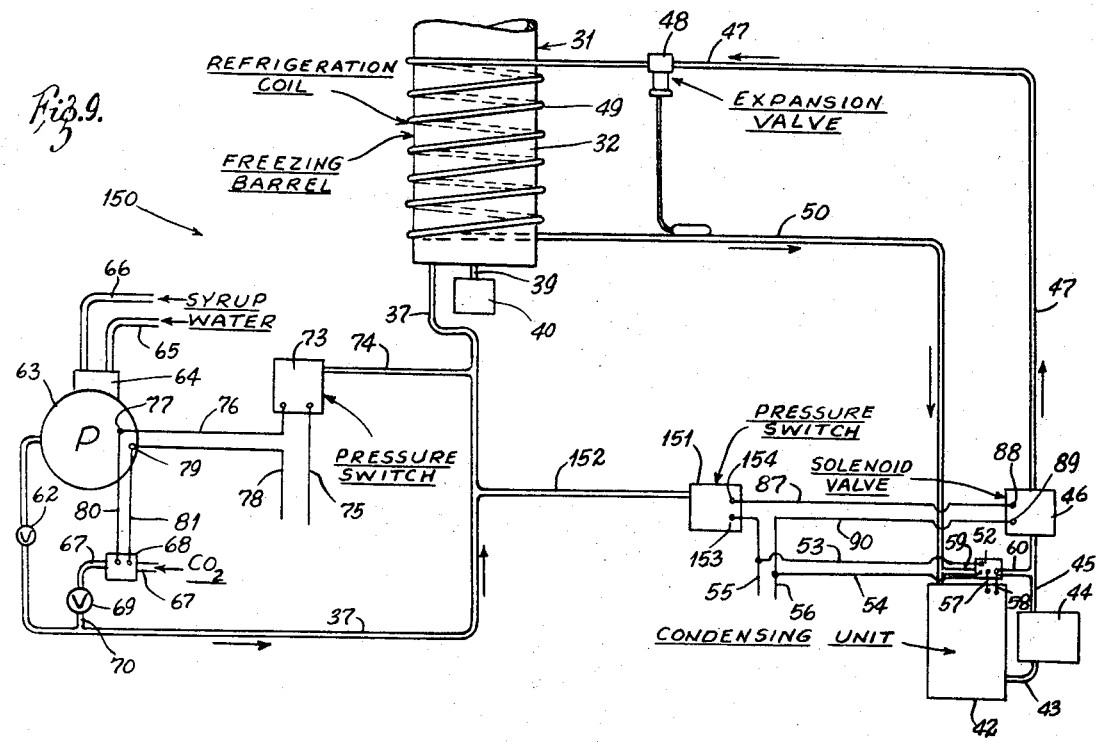
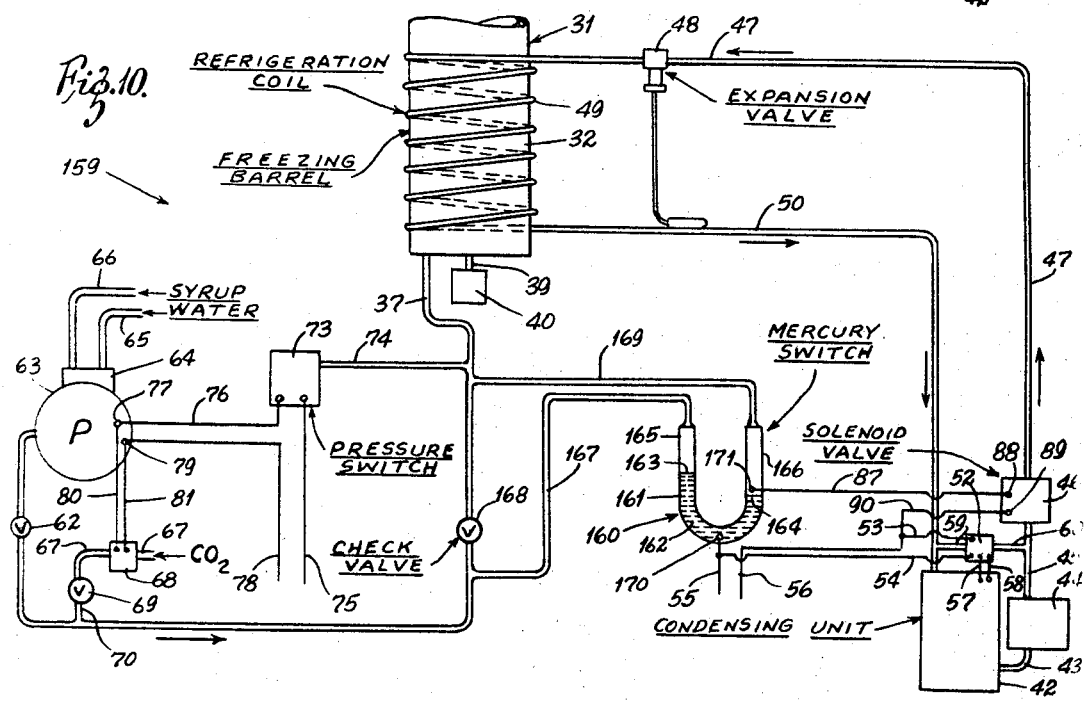

United States Patent Office 3,403,524
Patented Oct. 1, 1968

3,403,524
MACHINE FOR DISPENSING SEMI-FROZEN DRINKS AND CONTROL THEREFOR
Orville Mitchell, Richard L. Roden, William P. Freeman, Jr., John D. Harris, and Dudley C. Smith, Dallas, Tex., assignors to John E. Mitchell Company, Dallas, Tex., a corporation of Missouri
Filed Feb. 13, 1967, Ser. No. 615,722
22 Claims. (Cl. 62—70)

ABSTRACT OF THE DISCLOSURE

A system for controlling the liquid-solid consistency of confection ingredients within a dispenser wherein the consistency control is operable in response to pressure variations caused by refrigeration of the drink ingredients, for controlling the delivery of drink ingredients to the container in response to pressure variations caused by withdrawal of some of the drink ingredients from the container, and for coordinating the consistency control with the delivery control.

Cross references to related applications

This invention is an improvement upon the invention of U.S. Patent No. 3,108,449.

Background of the invention

This invention pertains to a machine for dispensing a confection. The confection may be a drink or a dessert, such as soft ice cream, of the kind made from water and flavoring. The machine produces a particularly good and unique drink or confection made from water and flavoring mixed with carbon dioxide gas. The machine has a container for receiving ingredients for the preparation of a drink or other confection with means for controlling the pumping of ingredients to the container in response to variations in pressure within the container caused by the variations in volume of ingredients within the container as they are dispensed and with means for controlling the refrigeration of the ingredients within the container in response to variations in pressure caused by removal of latent heat from the ingredients within the container.

Description of the prior art

U.S. Patent No. 3,108,449 is an example of efforts to regulate the consistency of a confection by response to changes in viscosity of the confection ingredients. Such mechanisms are relatively complicated and cumbersome and the results they produce are not wholly consistent and accurate. The present invention provides a system which controls the consistency of the confection in response to pressure changes caused by changes in latent heat content of the confection.

Summary

A closed container receives ingredients which are refrigerated to a desired liquid-solid consistency before being dispensed for consumption. The ingredients comprise proper proportions of water, flavoring and carbon dioxide. The water and flavoring are pumped in liquid form and the carbon dioxide in gaseous form to the container. The pump is controlled by a pressure switch that closes in response to reduced pressure within the container to replace ingredients dispensed and opens in response to increases in pressure when the correct mass of ingredients has been pumped to the container.
A refrigeration system cools the ingredients within the container. In the embodiment described, the drink to be consumed is a semi-frozen drink comprising tiny frozen particles each of which contains the proper proportions of water, flavoring and carbon dioxide. Before being dispensed from the container, these ingredients are refrigerated to a temperautre below the freezing point corresponding to atmospheric pressure, but they are also kept under pressure to inhibit freezing. Where the product is dispensed and released to atmospheric pressure, there is instantaneous freezing of the ingredients into the tiny frozen particles. The invention is also useful for making and controlling the consistency of other kinds of confections, such as soft ice cream.

A control regulates the operation of the refrigeration system. The control operates in response to changes in pressure within the container caused by expansion of the water due to refrigeration. The control causes the refrigeration system to operate and cool the ingredients until the pressure within the container reaches a predetermined level and to thereafter interrupt operation of the refrigeration system. Thus, this refrigeration control regulates cooling of the ingredients according to expansion and contraction of the water ingredient with alternate cooling and warming, and particularly in response to changes in pressure of the water ingredient resulting from variations in the latent heat content of the water. The invention takes advantage of the fact that, while the pressure of water like other liquids, is reduced with cooling, water is unique in that there is a reversal of this pressure change below about 38° F., and at its freezing temperature when the water is giving up latent heat, there is a particularly rapid increase in pressure.

Brief description of the drawing

FIGURE 1 is a schematic diagram of the drink dispensing system and its controls with parts shown in section;
FIGURE 2 is a side elevation view of one form of refrigeration control switch;
FIGURE 3 is a side elevation view of the control switch;
FIGURE 4 is a view in section taken along the line 4—4 of FIGURE 2;
FIGURE 5 is an enlarged fragmentary view in section of the upper central portion of FIGURE 4;
FIGURE 6 is a side elevation view of the switch contact element on a reduced scale;
FIGURE 7 is a side elevation view on a reduced scale of a disk forming part of the housing of the control switch;
FIGURE 8 is a side elevation view on a reduced scale of a plate forming part of the housing of the control switch;
FIGURE 9 is a schematic diagram of another form of dispenser and control; and
FIGURE 10 is a schematic diagram of still another form of dispenser and control.

Description of the preferred embodiment

Referring to FIGURE 1, this drink dispenser and control system 30 comprises a mixing and freezing barrel 31 having a cylindrical side wall 32 and front and back end walls 33 and 34. A dispensing nozzle 35 is controlled by a hand-operated valve 36 to selectively discharge drinks prepared in the mixing and freezing barrel 31. An inlet pipe or tube 37 extends through the back end wall 34 to introduce drink ingredients for proper preparation within the mixing and freezing barrel 31.

The mixing and freezing barrel 31 also contains agitator blades 38 which are mounted on a shaft 39. The shaft 39 is rotated by an agitator motor 40 to cause the blades 38 to revolve in close proximity to the inner cylindrical side wall of the mixing and freezing barrel 31.

The drink ingredients within the barrel 31 are cooled by a refrigeration system that comprises a conventional compressor and condenser unit 42 the discharge side of which is connected by a pipe 43 to a receiver 44. A pipe 45 connects the outlet from the receiver to the inlet to a solenoid valve 46. The outlet from the solenoid valve 46 is connected by a pipe 47 through an expansion valve 48 to a cooling coil 49 wrapped about the mixing and freezing barrel 31. Another pipe 50 returns refrigerant from the cooling coil 49 to the suction side of the compressor and condenser unit 42.

A standard bellows switch 52 is connected by a pair of conductors 53 and 54 across an AC power supply 55–56. The bellows switch 52 is connected by wires 57 and 58 to the compressor 42 to turn the compressor on and off. As is conventional, a tube 59 leading from the suction side of the compressor 42 makes the switch 52 responsive to changes in suction pressure on the low side of the compressor, and another tube 60 leads from the discharge or high pressure side of the compressor to the bellows switch 52. The bellows switch 52 is designed to de-energize the compressor 42 whenever the suction pressure drops below a predetermined minimum, depending upon the setting of the switch 52, or to de-energize the compressor whenever the high side pressure in the pipe 45 rises above a predetermined maximum. The switch 52 will operate automatically with changes in suction side pressure to turn the compressor-condenser unit 42 on and off, but if high side pressure becomes great enough to actuate the bellows switch 52 to turn the compressor off, the switch 52 must be manually reset.

Returning now to the pipe or tube 37 which delivers drink ingredients to the mixing and freezing barrel 31, that pipe or tube 37 is connected through a check valve 62 from the discharge side of a pump 63. The pump 63 has a mixing manifold 64 on its inlet side. A pipe or tube 65 is connected to a water supply (not shown) to deliver water to the mixing manifold. Another pipe 66 is connected to a syrup supply (not shown) to deliver syrup to the mixing manifold. Suitable valves (also not shown) permit regulation of the proportions of syrup and water. When the pump 63 operates, syrup and water mixed in the mixing manifold 64 are pumped through the check valve 62 and the pipe 37 to the mixing and freezing barrel 31. The check valve 62 prevents reverse flow back to the pump 63.

Another pipe or tube 67 is connected to a source of pressurized carbon dioxide (not shown). The pipe 67 delivers the carbon dioxide through a solenoid valve 68, a check valve 69, and a fixed orifice 70 to the pipe or tube 37. The orifice 70 regulates the rate of flow of carbon dioxide in proper proportion to the water and syrup in the pipe 37 and also reduces the pressure of the carbon dioxide.

Operation of the pump 63 is under the control of a pressure switch 73. A tube 74 is connected from the pipe 37 to the switch 73 to make the switch 73 responsive to pressures within the pipe 37 which, in turn, are equal to and variable with the internal pressure within the mixing and freezing barrel 31. The switch 73 can be made to open and close at different pressures sensed through the tube 74 and, for illustrative purposes, may be set to close when the pressure in the mixing and freezing barrel 31 drops below 23 p.s.i. and to open when the pressure rises above 25 p.s.i.

The switch 73 is wired in the circuit for the pump 63 and includes a wire 75 connected to one side of an AC power supply and another wire 76 connected to one of the pump terminals 77. Another wire 78 is connected from the other side of the AC power supply to the other pump terminal 79. Hence, when the switch 73 is closed, the circuit for the pump 63 across the AC power supply is closed, and the pump operates to deliver syrup and water through the pipe 37 to the barrel 31. The solenoid valve 68 is also in the pump circuit, with two wires 80 and 81 connecting the valve 68 in parallel with the pump 63.

Whenever the pressure switch 73 closes, the solenoid valve 68 is opened to permit carbon dioxide to flow through the pipe 67, the valve 69, and the orifice 70 into the pipe 37 to flow with the syrup and water to the barrel 31. When the pressure switch 73 is opened, the solenoid valve 68 is closed and the pump 63 is de-energized.

The solenoid valve 46, which is in the pipe 47 on the discharge side of the compressor 42, permits refrigerant to flow to the evaporator coil 49 when it is open and blocks the flow of refrigerant when it is closed. The solenoid valve 46 is controlled by a diaphragm switch 84. The diaphragm switch 84 is of a kind having diaphragm elements movable in response to variations in pressure differential to open and close a microswitch 85. The microswitch 85 is wired with one side connected by a wire 86 to one side 55 of the AC power supply 55–56 and with the other side connected by another wire 87 to a terminal 88 on the solenoid valve 46. The other terminal 89 of the solenoid valve 46 is connected by a wire 90 to the other side 56 of the AC power supply 55–56.

The diaphragm switch 84 is operated by variations in pressure differential between two pipes or tubes 93 and 94. As will be further described, the switch 84 actuates the microswitch 85 when there is a pressure differential in the pipes 93 and 94 above a predetermined value. The microswitch 85 is deactuated when the pressure differential is below the predetermined value. The pipe 93 has one end 95 joined to the pipe 37. Therefore, the pressure within the pipe 93 is always the same as the pressure within the mixing and freezing barrel 31. The pipe 94 has an end 96 joined to the pipe 93. However, a solenoid valve 97 is connected in the pipe 94 to alternately open and close communication between the pipe 94 and the pipe 93.

The solenoid valve 97 is connected by one wire 98 to one side 75 of the AC power supply 75–78, and by another wire 99 to a terminal 100 of a solenoid switch 101. Another wire 102 is connected between the other switch terminal 103 and the other side 78 of the AC power supply 75–78.

The solenoid switch 101 has a switch arm 104 that is controlled by a solenoid coil 105. The solenoid coil 105 is connected by wires 106 and 107 to the wires 80 and 81 of the circuit to the pump 63 and is therefore connected in parallel with the pump 63 to be energized and de-energized with the pump.

The switch 101 is normally closed, and is opened when the solenoid coil 105 is energized. The coil 105 controls the switch arm 104 through a core 108 as is conventional. However, there is a dash pot 109 connected to the end of the core 108 to resist closing of the switch arm 104 and therefore provide a time delay before the switch will close following energization of the coil 105. The time delay of the dash pot 109 may be preset for any desired delay for a purpose which will be apparent hereinafter, but the dash pot provides the delay only on closing of the switch 101, and the switch opens immediately upon energization of the coil 105.

FIGURES 2–8 illustrate one form of switch which will perform the functions of the diaphragm switch 84. The valve 110 of FIGURES 2–8 comprises a valve body 111 made of two opposing plates 112 and 113 held in place on opposite sides of a pair of disks 114 and 115 by a plurality of bolts 116. The plates 112 and 113 have inner faces 117 and 118 with wells 119 and 120 formed in their central portions to define pressure chambers. The inner faces 117 and 118 are also formed with annular recesses 121 and 122 surrounding the chambers 119 and 120.

The chambers 119 and 120 are closed by a pair of diaphragms 123 and 124 the outer edges of which are positioned within the recesses 121 and 122 and clamped tightly in place between the plates 112 and 113 and the disks 114 and 115. The fits are such that when the bolts 116 are tightened, no fluid can escape from the chambers 119 and 120 past the edges of the diaphragms 123 and 124. The pipes 93 and 94 are connected through the walls of the plates 112 and 113 to communicate with the chambers 120 and 119, respectively.

Each disk 114 and 115 is formed with upper and lower inwardly facing recesses 127 and 128. An actuator plate 129 extends through the openings 127 and the openings 128. A ball 130, which is welded to the actuator plate 129, is rotatably positioned between the recesses 127 of the plates 114 and 115, and a pin 131 which extends through a slot 132 in the actuator plate 129, guides the actuator plate 129 in its pivotal movement as will be described.

A pair of spacer blocks 134 and 135 are glued to opposite sides of the actuator plate 129. The outer faces of the blocks 134 and 135 are preferably glued to the flexible diaphragms 123 and 124. The blocks 134 and 135 cause the actuator plate 129 to pivot in response to movement of the diaphragms 123 and 124, and the diaphragms 123 and 124 move in response to pressure differentials between the chambers 119 and 120, these pressure differentials being the result of changes in pressures in the pipes 93 and 94 as has been described.

The microswitch 85 is mounted on the upper side of the plate 113 with its plunger 136 positioned adjacent the upwardly extending end of the actuator plate 129. When the plate 129 pivots in a clockwise direction as the result of an increase in pressure within the pipe 93 over the pressure in the pipe 94 responsive to which the diaphragms 123 and 124 move, the plate 129 actuates the microswitch 85. When the pressure differential in the pipes 93 and 94 decreases, the plate 129 swings in a counterclockwise direction, and the microswitch automatically deactuates when released from the actuator plate 129.

The operation of the system shown in FIGURE 1 will now be described. Water and syrup are supplied in the proper proportions through the pipes 65 and 66 to the mixing manifold 64. When the volume of drink ingredients within the barrel 31 is less than the capacity of the barrel and consequently the pressure within the mixing and freezing barrel 31 is below the low setting of the switch 73, such as 23 p.s.i., that pressure is felt within the pipe 37 and the pipe 74, and the pressure switch 73 responds to close the circuit to the pump 63 and the solenoid valve 68. Under these conditions, the syrup and water, in the liquid state, are pumped through the pipe 37 and are joined with carbon dioxide gas entering through the pipe 67 and the metering orifice 70, thence flowing to the mixing and freezing barrel 31.

Immediately upon closing of the pressure switch 73, the coil 105 is energized to withdraw the switch arm 104 from the contact terminals 100 and 103 to open the switch 101. This causes the solenoid valve 97 to open and establish communication between the pipe 94 and the pipe 93. Since the pipe 93 is connected to the pipe 37, its pressure is equal to the pressure within the pipe 37 and within the mixing and freezing barrel 31, and with the solenoid valve 97 open, the pressure within the pipe 94 is the same. Hence, there is no differential pressure on opposite sides of the diaphragm switch 84, so the microswitch 85 is not actuated.

When the microswitch 85 is in the unactuated condition, the solenoid valve 46 is open so the compressor-condenser unit 42 operates to circulate refrigerant through the cooling coil 49 to cool the contents within the mixing and freezing barrel 31. Therefore, the cooling of the mixing and freezing barrel 31 always begins immediately with operation of the pump 63.

As drink ingredients are pumped to the barrel 31, the pressure within the barrel rises, and when that pressure reaches the high setting of the pressure switch 73, such as 25 p.s.i., the pressure switch 73 opens to open the circuit to the pump 63. Simultaneously, the pump stops and the solenoid valve closes. At the same time, current stops flowing to the solenoid coil 105, and a conventional biasing means (not shown) urges the switch arm 104 toward the contact terminals 100 and 103. However, the dash pot 109 establishes a time delay before the switch arm 104 actually contacts the terminals 100 and 103. This delays closing of the solenoid valve 97 for a period of time sufficient to permit the pressure within the pipe 37 to stabilize following stopping of the pump 73. Usually, the proper setting for the dash pot 109 will provide a delay within the range of ½ second to 5 seconds.

When the switch 101 closes, closing the solenoid valve 97, the pressure within the pipe 94 between the solenoid valve 97 and the diaphragm switch 84 is isolated and will remain equal to the pressure which existed within the mixing and freezing barrel 31 prior to further refrigeration of the contents within the mixing and freezing barrel, usually about 25 p.s.i. Thereafter, the microswitch 85 remains unactuated until the pressure within the pipe 93 rises to a value which will establish a predetermined pressure differential between the pressures within the pipes 93 and 94. While the microswitch remains unactuated, the solenoid valve 46 remains open, and refrigerant is circulated through the cooling coil 49.

As the contents within the mixing and freezing barrel 31 continue to be refrigerated, tiny frozen particles begin to form within the mixing and freezing barrel. The continued operation of the agitator motor 40, which operates continuously whether or not the refrigeration system is operating, keeps the agitator blades 38 revolving within the barrel 31 to keep the product mixed and to maintain uniform cooling of the product.

This invention takes advantage of the physical changes in water responsive to decreases in its temperature. The volume and pressure of the water within the barrel decrease as the temperature is reduced to about 38 degrees, but then, with further reduction in temperature, the water expands and its pressure increases. At the proper temperature within the mixing and freezing barrel 31 at which the product is ready to be dispensed, namely about 27° to 29° F., the pressure within the barrel 31 rises by about one pound per square inch or to about 26 pounds per square inch. The diaphragm switch 84 is set to actuate the microswitch 85 when it senses a pressure differential of about one pound per square inch, so at this pressure within the barrel 31, the microswitch is actuated to close the solenoid valve 46. This stops flow of refrigerant to the cooling coil 49 and therefore stops refrigeration of the contents within the barrel 31. This setting of the diaphragm switch 84 in response to increases in pressure within the barrel 31 controls the operation of the refrigeration system to allow the temperature of the product within the barrel to reach the desired predetermined level. Depending upon what predetermined temperature is established, the state and consistency of the product within the barrel may be liquid at incipient freezing or partly frozen with partial freezing of some of the contents and with the remainder of the contents being in a liquid state.

Because of the super-atmospheric pressure maintained in the barrel 31, and with the continued operation of the agitator blades 38, the product is kept from completely freezing until it is released to atmospheric pressure upon operation of the dispensing valve 36. The diaphragm switch 84 also prevents the temperature of the product within the barrel 31 from rising because it is set to deactuate the microswitch 85 when the pressure within the barrel 31 drops to about 25½ pounds per square inch or the pressure differential in the pipes 93 and 94 to one-half pound per square inch. (The microswitch is a conventional one whose plunger is biased toward deactuated position, so the microswitch is automatically deactuated when released.) When the microswitch 85 is deactuated, the valve 46 again opens, permitting refrigerant to flow to the cooling coil 49, again lowering the temperature and raising the pressure within the barrel 31 until the pressure rises to 26 pounds per square inch and the pressure differential in the pipes 93 and 94 to one pound per square inch again. Thus, until product is released from the chamber 31, the diaphragm switch 84 continues to control the operation of the refrigeration system to maintain the proper temperature of the product and maintain its incipient freezing or partially frozen condition.

When the dispensing valve 36 is opened, the pressure within the barrel 31 causes the product to flow through the outlet nozzle 35 into a vessel held below it. As the product is discharged, its pressure is changed suddenly to atmospheric pressure. This causes instantaneous freezing of the unfrozen portions of the product into tiny frozen particles each of which is made up of the proper proportions of water, syrup and carbon dioxide.

When the valve 36 is opened to dispense a portion of the product, the resulting reduction in volume of the product within the barrel 31 reduces the pressure in the barrel 31 when that pressure again drops to the low setting of the pressure switch 73, such as 23 p.s.i. The pressure switch 73 again reacts to the reduced pressure in the pipe 37 to re-energize the pump 63, open the solenoid valve 68, and open the switch 101 to close the solenoid valve 97. The process of filling the barrel 31 is then repeated in the manner already described.

The pressure switch 84 can be set to actuate and de-actuate the microswitch 85 at any desired pressure differential. Variables which may affect these settings include location of the microswitch 85 relative to the actuator plate 129, internal resistance of the microswitch to actuation, and stiffness of the diaphragms 123 and 124. These variables can be coordinated empirically or experimentally for the desired pressure differentials.

It is further notable that the system of FIGURE 1 has the advantage of controlling the refrigeration system according to variations in pressure differentials rather than absolute pressures. Thus, even though the absolute pressure within the barrel 31 may vary slightly each time the pump 63 is disengaged upon filling the barrel, that beginning absolute pressure is captured and isolated in the pipe 94. Thereafter, the pressure switch responds to its set pressure differential to control the refrigeration system according to the pressure rise in the barrel 31 above that isolated beginning pressure. Hence, the consistency of the drink product in the barrel 31 is kept uniform.

*Description of a modification*

FIGURE 9 shows a modified drink dispenser and control system 150 which incorporates many of the components of the system shown in FIGURE 1. Where these components are the same, reference characters have been reused for the system 150. Thus, as FIGURE 9 shows, the mixing and freezing barrel 31 and its refrigeration system are identical to that shown in FIGURE 1. Likewise, the pump circuit and control for the pump 63 are the same as in FIGURE 1. However, a different control for the refrigeration system is used.

In the system of FIGURE 9, a pressure switch 151 responds to variations in pressure within a tube 152 which in turn is connected to the pipe 37 which delivers drink ingredients from the pump 63 to the barrel 31. The pressure switch has one terminal 153 connected to one side 55 of the AC power supply 55–56. The other terminal 154 of the pressure switch 151 is connected by the wire 87 to the terminal 88 of the solenoid valve 46. The other terminal 89 of the solenoid valve 46 is connected by the wire 90 to the other side 56 of the AC power supply 55–56.

The pressure switch 151 is set to close whenever it senses pressures within the tube 152 below a predetermined value and to open whenever it senses pressures within the pipe 152 above a predetermined value. When the switch 151 closes, it closes the circuit to the solenoid valve 46 to open the valve and permit refrigerant to flow from the compressor-condenser unit 42 to the cooling coil 49. When the pressure switch 151 opens, it opens a circuit to the solenoid valve 46 and causes the valve to close.

The pressure switch 73 operates in the manner already described to control operation of the pump 63 and the solenoid valve 68 according to pressure variations within the pipe 37. As before, the pressure switch 73 is set to respond to a predetermined low pressure corresponding to a deficient volume of drink ingredients within the mixing and freezing barrel 31, and to a predetermined high pressure corresponding to presence of a full volume of drink ingredients within the barrel 31. The pressure settings for the pressure switch 151 are at higher levels and usually within a narrower range than those of the pressure switch 73. For example, if the low setting for the pressure switch 73 is 23 p.s.i. and the high setting 25 p.s.i., the low setting for the pressure switch 151 may be 25½ p.s.i. and the high setting 26 p.s.i.

With these settings of the pressure switches 73 and 151, proper volume and proper refrigeration of the drink ingredients within the barrel 31 will be maintained. When there is a deficiency in the volume of drink ingredients within the barrel 31, the pressure in the barrel and in the pipe 37 will drop. This reduced pressure is sensed in the tube 74, and if that pressure drops to 23 p.s.i. or lower, the pressure switch 73 closes, closing the circuit to the pump 63 and the solenoid valve 68. Since this pressure is also below the 25½ p.s.i. low setting for the pressure switch 151, that switch closes and opens the solenoid valve 46. Therefore, the pump 63 pumps syrup and water, joined with carbon dioxide, to the barrel 31 until the barrel is filled and its pressure rises to 25 p.s.i.; and while the pump operates, the compressor and condenser unit 42 continues to circulate refrigerant through the cooling coil 49. Upon sensing a pressure within the barrel 31, pipe 37, and tube 74 of 25 p.s.i., the pressure switch 73 opens, opening the circuit to the pump 63 and the solenoid valve 68. However, the pressure switch 151 remains closed and refrigerant continues to be circulated through the cooling coil 49. As the product within the barrel 31 is cooled, and latent heat is removed, the pressure within the barrel 31 rises. There may be partial freezing of the drink ingredients, depending upon the high pressure setting of the pressure switch 151, with further increases in pressure within the barrel 31. When the pressure within the barrel 31 reaches the high setting, such as 26 p.s.i., the pressure switch 151 responds and opens, closing the solenoid valve 46 and blocking the flow of refrigerant to the cooling coil 49.

If the product within the barrel 31 subsequently absorbs latent heat sufficiently to reduce its pressure to 25½ p.s.i., the switch 151 again responds to close and open the solenoid valve 46. Refrigerant again flows to the cooling coil 49 until the product within the barrel 31 is cooled and its pressure again increased to 26 p.s.i. In this manner, the pressure switch 151 continues to control the operation of the refrigeration system and maintain the proper desired consistency of the product within the barrel 31. Likewise, the pressure switch 73 operates whenever two or three drinks have been dispensed from the barrel 31 to close the circuit to the pump and the solenoid valve 68 to replenish the supply of drink ingredients to the barrel 31.

*Description of another modification*

FIGURE 10 illustrates another drink dispenser and control system 159. As with the system 150 of FIGURE 9, most of the components of the system 159 are identical to those of the system 30 in FIGURE 1, as the repeated reference characters indicate. In the system of FIGURE 10, a mercury switch 160 comprises a U-tube 161 which is partially filled with mercury 162 having varying levels 163 and 164 within the two branches 165 and 166 of the U-tube. The branch 165 of the U-tube is connected by a tube 167 to the pipe 37 upstream of a check valve 168. The branch 166 is connected by a tube 169 to the pipe 37 downstream of the check valve 168.

The U-tube 161 has an electric contact 170 that is always in contact with the bath of mercury 162. There is another electric contact 171 in the branch 166 of the U-tube 161 that is in electrical contact with the bath of mercury 162 only when the mercury rises sufficiently within the branch 166. The electric contact 170 is connected to one side 55 of the AC power supply 55–56. The other electric contact 171 is connected by the wire 87 to a terminal 88 of the solenoid valve 46, the other terminal 89 of which is connected by the wire 90 to the other side 56 of the AC power supply 55–56.

In the operation of the system 159 shown in FIGURE 10, the pressure switch 73 is again set to close in response to pressures within the tube 74 below 23 p.s.i. and to open when the pressure in the tube 74 rises to 25 p.s.i. The mercury switch 160 responds to a pressure differential as follows. The pressure within the pipe 167 is always equal to the pressure existing within the mixing and freezing barrel 31 at the time the pump 63 is de-energized because the check valve 168 prevents reverse flow of liquid from the barrel 31 back toward the pump 63. Hence, as the pump 63 operates to raise the pressure within the barrel 31, the pressure transmitted through the tube 167 is applied against the upper surface 163 of the mercury bath 162 within the branch 165 of the U-tube 161. When the pressure within the barrel 31 reaches 25 p.s.i. and the switch 73 opens, no further liquid is pumped to the barrel 31, and the 25 p.s.i. pressure is held in the pipe 37 upstream of the check valve 168 and in the pipe 167. This same 25 p.s.i. pressure is also transmitted through the tube 169 to the other branch 166 of the U-tube 161. With the pressures within the two branches 165 and 166 of the U-tube at equal values, the levels 163 and 164 of the mercury bath 162 are equal, the mercury within the branch 166 rising above the level of the electric contact 171. Therefore, during operation of the pump 63 and initially upon de-energizing the pump 63, the circuit to the solenoid valve 46 is closed, the circuit being completed through the mercury bath 162 in contact with the electric contacts 170 and 171.

As the refrigeration system circulates refrigerant through the coil 49, increasing the pressure within the barrel 31, the increased pressure is felt in the tube 169, whereas the check valve 168 prevents this increase in pressure from being felt within the tube 167. Therefore, a pressure imbalance occurs, depressing the level of mercury within the branch 166 and raising the level within the branch 165. The position of the electric contact 171 is such that contact between it and the mercury within the branch 166 will be broken when the pressure differential in the branches 165 and 166 reaches a predetermined value, usually set at between ½ and 1 p.s.i. Thus, the operation of the refrigeration system is controlled by the mercury switch 160 within close pressure limits to regulate and maintain the proper consistency of the drink within the barrel 31, and the pressure switch 73 replenishes drink ingredients as they are dispensed.

Various changes and modifications may be made within the purview of this invention as will be readily apparent to those skilled in the art. Such changes and modifications are within the scope and teaching of this invention as defined by the claims appended hereto.

What is claimed is:

1. Apparatus for controlling the consistency of a confection comprising a pressure-tight container for receiving confection ingredients means for admitting the confection to the container, refrigerator means for cooling the confection ingredients within the container, and means responsive to variations in pressure within the container corresponding to variations in temperature of the ingredients therein toward and away from the freezing point of the ingredients for controlling operation of the refrigerator means and means to discharge confection from the container.

2. The apparatus of claim 1 including means responsive to variations in pressure within the container corresponding to variations in volume of confection and confection ingredients within the container for controlling operation of the supplying means.

3. The apparatus of claim 1 including means to sense a first pressure established by the confection ingredients within the container prior to final cooling thereof, means to sense a second pressure established by the confection ingredients within the container following cooling thereof after establishment of the first pressure, the pressure responsive refrigerator control means being responsive to variations in the differential between the first and second pressures.

4. The apparatus of claim 3 wherein the pressure responsive means comprises diaphragm elements exposed to the first and second pressures, and a switch operated by movement of the diaphragm elements, the refrigerator means being operable in response to operation of the switch.

5. The apparatus of claim 3 wherein the pressure responsive means comprises a bath of electrically conductive fluid, a container for the bath, opposite sides of the container being exposed to the first and second pressures whereby the fluid is movable within the container in response to variations in pressure differential between the first and second pressures, operation of the refrigeration being controlled by an electric circuit, the electric circuit including electric contacts positioned to be connected and disconnected by contact with the fluid as the fluid moves within the container.

6. Apparatus for controlling the consistency of a confection of the kind having water, flavoring, and carbon dioxide comprising a container for receiving water, flavoring, and carbon dioxide, means to supply water, flavoring, and carbon dioxide to the container, valve means for withdrawing the confection from the container, means to refrigerate the water, flavoring, and carbon dioxide within the container, means to actuate the supply means in response to decrease in the pressure caused by reduction in volume of the confection within the container, and to deactuate the supply means in response to increase in the pressure caused by increase in volume of the confection within the container, and means to alternately actuate and deactuate the refrigerating means in response to changes in pressure caused by changes in heat content of the confection within the container.

7. The apparatus of claim 6 wherein the means to alternately actuate and deactuate the refrigerating means comprises a switch operable in response to pressure variations within a range higher than the range of pressure variations to which the means to actuate the supply means responds.

8. The apparatus of claim 6 wherein the pressure maintained within the container by the means to actuate the supply means and the temperature maintained within the container by the means to alternately actuate and deactuate the refrigerating means are set to cause reduction in temperature of the confection to approximately its freezing point at a super-atmospheric pressure but with less than total freezing of the confection.

9. The apparatus of claim 6 wherein the means to alternately actuate and deactuate the refrigerating means comprises a switch responsive to a pressure differential the lower value of which is established by deactuation of the supply means.

10. A machine for making a semi-frozen confection comprising a closed container having a discharge outlet with a valve for opening and closing the discharge outlet and having an inlet for receiving water, syrup and carbon dioxide ingredients, means to maintain the pressure within the container above atmospheric pressure, means to refrigerate the ingredients within the container to a temperature which is below the freezing point of water at atmospheric pressure but which is above that temperature at which all the water within the container will freeze at the pressure within the container, means to control the supply of water, syrup and carbon dioxide to the container in response to variations in pressure caused by discharging ingredients from the container and to thereby maintain sufficient ingredients within the container to maintain a pressure above a predetermined minimum value, means to control operation of the refrigerating means in response to variations in pressure resulting from expansion and contraction of the water or ice mixture due to temperature variations toward and away from the freezing point of the mixture within the container, whereby the pressure and temperature are maintained as aforesaid to prevent complete freezing of the ingredients while within the container and to cause substantially instantaneous freezing of at least some of the unfrozen ingredients released to atmospheric pressure through the discharge outlet.

11. A method of preparing a consumable confection comprising the steps of introducing syrup, water and carbon dioxide into a closed container, maintaining the pressure within the container at a value above atmospheric pressure, refrigerating the syrup, water and carbon dioxide within the container, controlling the degree of refrigeration in response to changes in corresponding to changes in temperature pressure of the syrup, water and carbon dioxide mixture within the container and thereby maintaining the temperature of the syrup, water and carbon dioxide mixture within the container at a value which is below the freezing point of water at atmospheric pressure but is above or at the freezing point of water at the pressure within the container, and releasing controlled amounts of the water, syrup and carbon dioxide from the container to atmospheric pressure to thereby cause instantaneous freezing of at least some of the water into tiny ice particles containing portions of syrup and carbon dioxide.

12. The method of claim 11 including the step of agitating the water, syrup and carbon dioxide in the container to maintain a homogeneous mixture and uniform temperature thereof.

13. The method of claim 11 including the step of controlling the supply of water, syrup and carbon dioxide to the container in response to pressure variations caused by changes in the mass of water, syrup and carbon dioxide within the container.

14. Apparatus for controlling the consistency of a confection of the kind having water as an ingredient comprising an enclosure, means for delivering water and such other ingredients as may be included in the confection to the enclosure, means for actuating the delivering means in response to reduction of pressure within the enclosure to a predetermined first value, means for deactuating the delivering means in response to increases in pressure within the enclosure to a predetermined second value higher than the first value, means for refrigerating the ingredients within the enclosure, means for actuating the refrigerating means upon actuation of the delivering means, and means for deactuating the refrigerating means upon increase in pressure within the enclosure to a third value above the second value occurring upon cooling the mixture to or near the freezing point of the ingredient mixture at the pressure within the container.

15. The system of claim 14 wherein the conveying means includes a pump for pumping water and other ingredients to the enclosure, the means for actuating and deactuating the conveying means comprises a first pressure switch actuable between open and closed positions to alternately open and close the electric circuit to the pump, the pressure switch being actuable to one position upon decrease in pressure within the enclosure to the first-named value and to the other position upon increase in pressure within the enclosure to the second-named value, and the means for actuating and deactuating the refrigerating system comprises another switch movable between open and closed positions, one of the said positions causing actuation of the refrigerating means and the other of the said positions causing deactuation of the refrigerating means.

16. A method of controlling the consistency of a confection which comprises delivering confection ingredients to an enclosure capable of being pressurized internally, sensing the changes in pressure within the enclosure caused by changing the volume of ingredients within the enclosure, refrigerating the ingredients within the enclosure, delivering drink ingredients to the enclosure and simultaneously refrigerating the ingredients within the enclosure in response to pressures sensed within the enclosure below a predetermined first value, discontinuing delivery of ingredients to the enclosure in response to sensing pressure within the enclosure at a second value above the first value without interrupting refrigeration of the ingredients within the enclosure, establishing a predetermined pressure increment above the second pressure value, sensing increases in pressure within the enclosure above the second value and within the established increment, and discontinuing refrigeration of the ingredients within the enclosure in response to increase in pressure of ingredients within the enclosure to the high pressure limit of the established increment.

17. A method of producing a carbonated confection comprising the steps of introducing confection ingredients which include water, flavoring, and carbon dioxide into a closed container to a volume corresponding to a predetermined first pressure above atmospheric pressure within the container, refrigerating the ingredients within the container to reduce the temperature of the ingredients to near the freezing point of water at the pressure within the container, and discontinuing refrigeration of the ingredients upon the sensing of an increase of pressure of the ingredients within the container to a predetermined second pressure which is above the first pressure, and is created by expansion of the water mixture as a result of refrigeration.

18. The method of claim 17 including the step of reestablishing refrigeration of the ingredients when the pressure within the container drops to a predetermined value between the first and second pressures as a result of contraction of the liquid mixture with increased temperature.

19. The method of claim 18 including discharging the confection from the container, and introducing additional ingredients into the container as the pressure therein falls below the predetermined first pressure because of reduced volume occurring with discharge of confection from the container.

20. Apparatus for controlling the consistency of a water base confection comprising, a pressure tight container for receiving confection ingredients, means for admitting the confection to the container refrigerator means for cooling the confection ingredients within the container, and means responsive to increases in pressure of the confection ingredients corresponding to decrease in temperature to or near the freezing point thereof for de-energizing the refrigerator means and responsive to decreases in pressure of the confection ingredients corresponding to increase in temperature of the ingredients above the freezing point thereof for energizing the refrigerator means and means to discharge confection from the container.

21. The apparatus of claim 20 including means responsive to decreases in pressure within the container to pressure values below that at which the refrigerator means is energized for actuating the ingredient supply means.

22. The apparatus of claim 21 wherein the ingredients include water, flavor, and carbon dioxide.

References Cited

UNITED STATES PATENTS

| | | | |
|---|---|---|---|
| 2,134,787 | 11/1938 | Hartman | 62—70 |
| 2,594,442 | 4/1952 | Irwin | 62—70 |
| 2,827,773 | 3/1958 | Detjen | 62—135 |
| 3,044,878 | 7/1962 | Knedlik | 62—306 X |
| 3,255,600 | 6/1966 | Mitchell et al. | 62—69 |

ROBERT A. O'LEARY, *Primary Examiner.*

W. E. WAYNER, *Assistant Examiner.*

UNITED STATES PATENT OFFICE
CERTIFICATE OF CORRECTION

Patent No. 3,403,524                                  October 1, 1968

Orville Mitchell et al.

It is certified that error appears in the above identified patent and that said Letters Patent are hereby corrected as shown below:

Column 11, line 22, beginning with "11. A method of" cancel all to and including "carbon dioxide." in line 40, same column 11, and insert the following claim:

11. A method of preparing a consumable confection comprising the steps of introducing syrup, water and carbon dioxide into a closed container, maintaining the pressure within the container at a value above atmospheric pressure, refrigerating the syrup, water and carbon dioxide within the container, controlling the degree of refrigeration in response to changes in pressure corresponding to changes in temperature of the syrup, water and carbon dioxide mixture within the container and thereby maintaining the temperature of the syrup, water and carbon dioxide mixture within the container at a value which is below the freezing point of water at atmospheric pressure but is above or at the freezing point of water at the pressure within the container, and releasing controlled amounts of the water, syrup and carbon dioxide from the container to atmospheric pressure to thereby cause instantaneous freezing of at least some of the water into tiny ice particles containing portions of syrup and carbon dioxide.

Signed and sealed this 3rd day of March 1970.

(SEAL)
Attest:

EDWARD M. FLETCHER, JR.                     WILLIAM E. SCHUYLER, JR.
Attesting Officer                                Commissioner of Patents